US 8,942,609 B2
Jan. 27, 2015

(12) United States Patent
Hata

(54) MOUNTING STRUCTURE FOR BEARING MEMBER, FIXING DEVICE, AND IMAGE FORMING APPARATUS

(71) Applicant: Masaki Hata, Nagoya (JP)

(72) Inventor: Masaki Hata, Nagoya (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 0 days.

(21) Appl. No.: 13/803,338

(22) Filed: Mar. 14, 2013

(65) Prior Publication Data

US 2013/0259545 A1  Oct. 3, 2013

(30) Foreign Application Priority Data

Apr. 2, 2012 (JP) ................................. 2012-083948

(51) Int. Cl.
| | |
|---|---|
| F16C 33/04 | (2006.01) |
| F16C 35/02 | (2006.01) |
| G03G 15/20 | (2006.01) |
| F16C 17/02 | (2006.01) |

(52) U.S. Cl.
CPC .................. *F16C 33/04* (2013.01); *F16C 35/02* (2013.01); *G03G 15/2017* (2013.01); *F16C 2370/38* (2013.01); *F16C 17/02* (2013.01); *F16C 2226/12* (2013.01); *G03G 15/2053* (2013.01)
USPC .......................................... 399/328; 384/296

(58) Field of Classification Search
USPC .................................... 384/91, 296
See application file for complete search history.

(56) References Cited

U.S. PATENT DOCUMENTS

| | | | | |
|---|---|---|---|---|
| 3,704,048 | A | * | 11/1972 | Yoshikawa et al. ............ 384/192 |
| 6,072,155 | A | * | 6/2000 | Tomatsu ........................ 219/216 |
| 6,728,993 | B1 | | 5/2004 | Murayama |
| 2009/0092409 | A1 | * | 4/2009 | Chiyoda et al. ................. 399/67 |

FOREIGN PATENT DOCUMENTS

| | | |
|---|---|---|
| JP | 63-088055 U | 6/1988 |
| JP | 05-134573 A | 5/1993 |
| JP | 06-124050 A | 5/1994 |

(Continued)

OTHER PUBLICATIONS

International Search Report (PCT/ISA/210) issued on Oct. 31, 2011, by the European Patent Office as the International Searching Authority for International Application No. PCT/EP2011/066272.

(Continued)

*Primary Examiner* — Clayton E Laballe
*Assistant Examiner* — Jas Sanghera
(74) *Attorney, Agent, or Firm* — Buchanan Ingersoll & Rooney P.C.

(57) ABSTRACT

A mounting structure for a bearing member comprises the bearing member, bearing a rotary shaft; a frame body that includes a mounting hole; and a plurality of projections, each of the projections being formed at one of three or more positions on at least one of an outer circumferential surface of the bearing member and an inner circumferential surface of the mounting hole, the positions extending radially from a center of the rotary shaft, the bearing member being press fitted into the mounting hole via the projections, each of the projections being formed at a circumferential position having no other projection formed at a position 180° therefrom with respect to the center of the rotary shaft.

13 Claims, 13 Drawing Sheets

(56) References Cited

FOREIGN PATENT DOCUMENTS

| JP | 09-303408 A | 11/1997 |
| JP | 2001-3939 A | 1/2001 |
| JP | 2003-72373 A | 3/2003 |
| JP | 2007-155891 A | 6/2007 |

OTHER PUBLICATIONS

Office Action (Notification of Reasons for Refusal) issued on Jul. 22, 2014, by the Japan Patent Office in corresponding Japanese Patent Application No. 2012-083948, and an English Translation of the Office Action. (5 pages).

* cited by examiner

Action

Reaction

Action

Reaction

MOUNTING STRUCTURE FOR BEARING MEMBER, FIXING DEVICE, AND IMAGE FORMING APPARATUS

This application is based on application No. 2012-083948 filed in Japan, the content of which is hereby incorporated by reference.

BACKGROUND OF THE INVENTION (1) Field of the Invention

The present invention relates to a mounting structure for mounting, into a frame, a bearing member supporting a rotary shaft, and to a fixing device and image forming apparatus using the mounting structure for the bearing member.

(2) Description of Related Art

An electrophotographic image forming apparatus transfers a toner image formed on a circumferential surface of a photosensitive drum onto a recording sheet, and then performs thermal fixing by way of passing through a fixing nip formed between a heating roller and a pressurising roller of a fixing device.

Ordinarily, in the fixing device, the nip pressure (pressure in the fixing nip) between the heating roller and the pressurising roller is made sufficient so as to prevent improper fixing when the toner image on the recording sheet is heated in the fixing nip. When the fixing operation is not performed, the pressurising roller and the fixing roller are separated using a cam mechanism or the like in order to prevent elastic deformation of the rollers.

Incidentally, given that the nip pressure between the pressurising roller and the fixing roller is quite great, strong forces must be applied to execute the pressing and separation of the rollers. Particularly, when the rollers are pressed together or separated, a powerful impact force is applied to the rotary shaft of each roller, to the drive shaft of the cam, and so on. When there is backlash between a bearing member and the mounting hole in which the roller is mounted, a problem arises in that noise is produced due to the impact on the component having backlash.

In order to avoid this problem, for example, the occurrence of backlash is preventable by inserting the bearing member into the mounting hole through a collar or the like, with powerful pressing force, and fixing the bearing member in a state where the entire circumference thereof is pressurised by the inner circumferential surface of the mounting hole.

However, in such situations, the entire circumference of the collar is subject to intense compression, and as such, the radial density thereof becomes extremely high. Thus, an impact applied to the rotary shaft is hardly attenuated, and is propagated to the support frame. As a result, noise is produced by vibrations in the support frame, and these vibrations may have a negative influence on image formation operations if further propagated to the support frame of an image forming unit.

These problems, which occur due to mechanical vibrations in rotary components, occur not only with compression and separation in the fixing device but also, for example, when vibrations generated as the gears of a drive transmission mesh together are propagated to the support frame via the bearing member, and the like.

SUMMARY OF THE INVENTION

In consideration of the above problem, the present invention aims to provide a mounting structure for a bearing member that enables the bearing member of a rotary shaft for a rotating body to be mounted with such positioning that backlash is not produced in the support frame, and that attenuates and thus decreases propagation of mechanical vibrations generated at the rotary shaft, as well as an image forming apparatus and a fixing device using the mounting structure for the bearing member.

To achieve this aim, in one aspect of the present invention, a mounting structure for a bearing member comprises: the bearing member, bearing a rotary shaft; a frame body that includes a mounting hole; and a plurality of projections, each of the projections being formed at one of three or more positions on at least one of an outer circumferential surface of the bearing member and an inner circumferential surface of the mounting hole, the positions extending radially from a centre of the rotary shaft, the bearing member being press fitted into the mounting hole via the projections, wherein each of the projections is formed at a circumferential position having no other projection formed at a position 180° therefrom with respect to the centre of the rotary shaft.

Also, in another aspect of the present invention, a fixing device comprises a mechanism operable to contact and separate a fixing roller and a pressing roller, wherein a bearing member of at least one rotary shaft, among rotary shafts for the fixing roller and the pressing roller and a rotary shaft in the mechanism, is mounted in a mounting hole of a support frame using the mounting structure for the bearing member described above.

Also, in a further aspect of the present invention, an image forming apparatus comprises the fixing device described above.

Further, in an additional aspect of the disclosure, an image forming apparatus includes a bearing member of one or more rotary shafts for rotary bodies that is mounted in a support frame using the mounting structure for the bearing member described above.

BRIEF DESCRIPTION OF THE DRAWINGS

These and other objects, advantages, and features of the invention will become apparent from the following description thereof taken in conjunction with the accompanying drawings that illustrate a specific embodiment of the invention.

In the drawings.

DESCRIPTION OF THE PREFERRED EMBODIMENTS

The following describes an Embodiment of the present invention, with reference to the accompanying drawings.

(1) Printer Configuration

Figure 1:
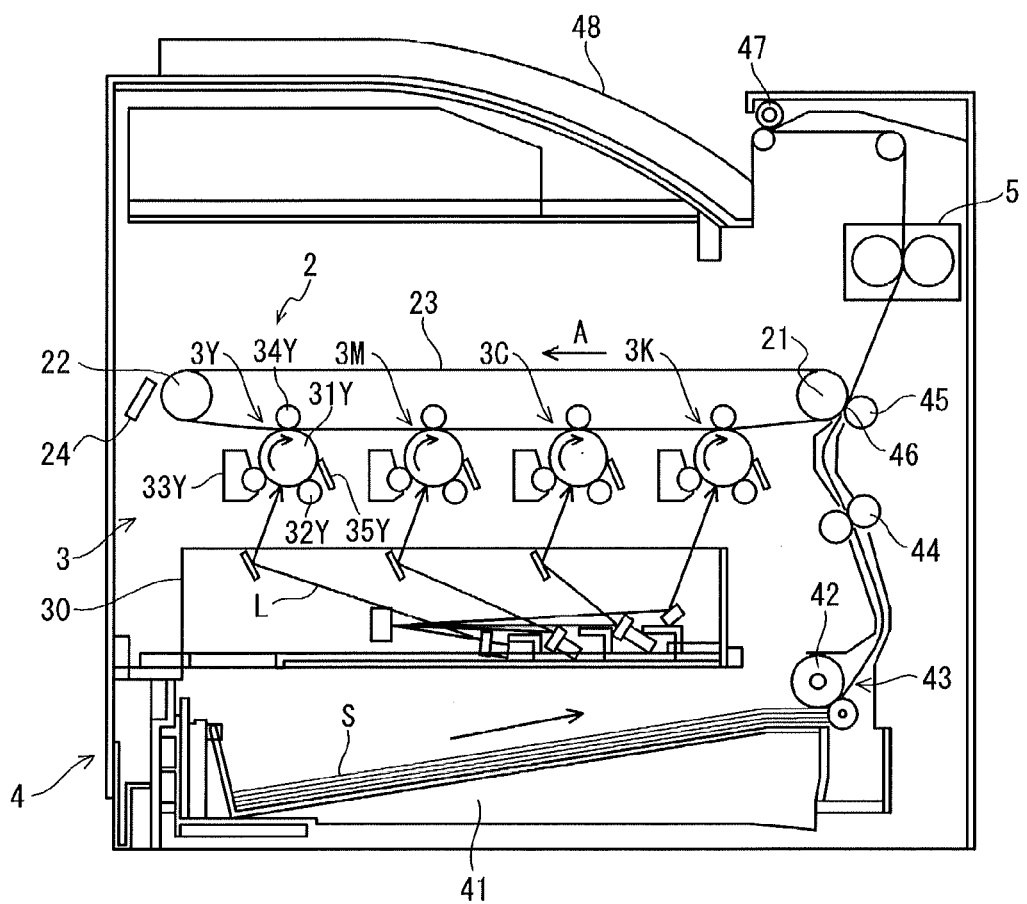
FIG. 1 illustrates the configuration of a printer having a fixing device pertaining to an Embodiment of the present invention.

FIG. 1 illustrates the configuration of a tandem color printer (hereinafter simply termed printer) serving as an example of an image forming apparatus equipped with the fixing device pertaining to the present Embodiment.

As shown, the printer 1 includes an intermediate transfer unit 2, an image processing unit 3, a feed unit 4, and the fixing device 5.

The printer 1 is connected to a network (e.g., a LAN) and receives a print instruction from an external (non-diagrammed) terminal apparatus. In accordance with the instruction, the printer 1 then executes a printing process onto a recording sheet by forming toner images in each of yellow, magenta, cyan, and black, and performing a multi-layer transfer of the toner images to the recording sheet, thus forming a full color image. The colors yellow, magenta, cyan, and black, are hereinafter respectively represented by the letters Y, M, C, and K, and components pertaining to these colors have the corresponding letters Y, M, C, and K appended to the reference signs thereof.

The intermediate transfer unit 2 includes a driving roller 21 and a driven roller 22. An intermediate transfer belt 23 overhangs the rollers 21 and 22, and is driven to rotate at a predetermined speed in the direction indicated by arrow A.

Also, a cleaner 24 is provided in the vicinity of the driven roller 22 and removes toner remaining on the intermediate transfer belt 23.

The image processing unit 3 includes imaging units 3Y, 3M, 3C, and 3K, an exposure unit 30, and so on. The imaging units 3Y, 3M, 3C, and 3K are configured identically. As such, the configuration of imaging unit 3Y is described below as a representative example.

The imaging unit 3Y includes a photosensitive drum 31Y, and has disposed therearound a charger 32Y, a developer 33Y, a primary transfer roller 34Y, a cleaner 35Y cleaning the photosensitive drum 31Y, and so on. A toner image is formed in the Y color on the photosensitive drum 31Y. The developer 33Y faces the photosensitive drum 31Y and carries charged toner to the photosensitive drum 31Y.

The exposure unit 30 is provided with light-emitting elements, such as a laser diode, and emits laser light L for forming the images in the colors Y, M, C, and K in accordance with a drive signal from a (non-diagrammed) controller. The laser light L scans and exposes the photosensitive drum in each of the imaging units 3Y, 3M, 3C, and 3K. A static latent image is formed on the photosensitive drum 31Y charged by the charger 32Y as a result of the light exposure. A latent static image is similarly formed on the photosensitive drum of each of the imaging units 3M, 3C, and 3K.

The latent static image formed on each of the photosensitive drums is developed by the developer of each respective imaging unit 3Y, 3M, 3C, 3K and forms a toner image on the photosensitive drum in the corresponding color. The toner images so formed create a color toner image by the primary transfer roller of each imaging unit 3Y, 3M, 3C, and 3K (in FIG. 1, reference sign 34Y refers only to the primary transfer roller for imaging unit 3Y; reference signs are omitted for the other three primary transfer rollers) sequentially performing a primary transfer onto the intermediate transfer belt 23 with offset timing such that the toner images are overlaid at a common position on the intermediate transfer belt 23.

The feed unit 4 includes a sheet cassette 41 containing a recording sheet S, a pick-up roller 42 picking up the recording sheet S from the sheet cassette 41 for feeding, one sheet at a time, to a transport path 43, and timing rollers 44 transporting the picked-up recording sheet to a secondary transfer position 46 at the proper timing.

The timing rollers 44 transport the recording sheet S to the secondary transfer position 46 with timing matching that at which the toner images having undergone the primary transfer onto the intermediate transfer belt 23 are transported to the secondary transfer position 46. Then, the color toner image on the intermediate transfer belt 23 is transferred, as one, onto the recording sheet S in a secondary transfer at the secondary transfer position 46 by a secondary transfer roller 45.

The recording sheet S onto which the toner image has been transferred in the seconder transfer is then transported to the fixing device 5. The (unfixed) toner image on the recording sheet S is then heated and pressurized by the fixing device 5 and, after thermal fixing, the recording sheet S is expelled onto an exit tray 48 by an exit roller 47.

The intermediate transfer unit 2, the image processing unit 3, and the feed unit 4 are uniformly controlled by the non-diagrammed controller, so as to execute smooth print operations.

(2) Fixing Device Configuration

Figure 2:
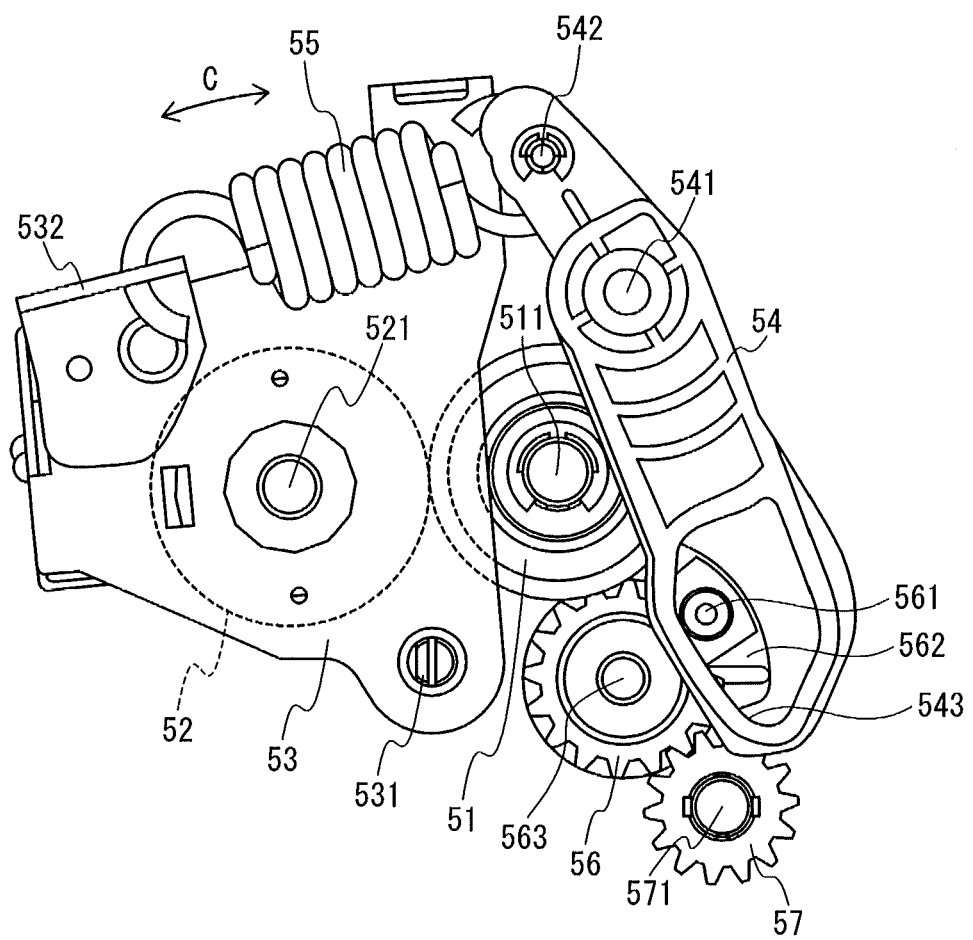
FIG. 2 illustrates the important components of the fixing device.

FIG. 2 is a side-view diagram illustrating the main components of the fixing device 5.

As shown, the fixing device 5 includes a fixing roller 51 and a pressurising roller 52 that is in contact with the circumference of the fixing roller 51. In the present description, the pressurising roller 52 is described as separated from the circumference of the fixing roller 51 to indicate not only situations where the fixing roller 51 and the pressurising roller 52 are completely separated, but also situations where the nip pressure is sufficiently low as to not cause plastic deformation in the fixing roller 51 and the pressurising roller 52. FIG. 2 illustrates the later separation situation.

The fixing roller 51 is pivotally supported by the main frame (not shown in FIG. 2; reference sign 58 in FIG. 3) of the fixing device 5 via a drive shaft 511, and has a halogen heater mounted inside.

The pressurising roller 52 is pivotally supported by a support frame 53 via a rotary shaft 521. The pressurising roller 52 has an elastic layer (non-diagrammed) formed at the outer circumference thereof from an elastic, heat-resistant material, such as silicone rubber, so as to form a fixing nip of sufficient width when pressurised.

The support frame 53 is pivotally supported by the main frame via a pivot 531 so as to freely swing as indicated by arrow C. A spring engaging member 532 of the support frame 53 and a spring engaging pin 542 attached to an upper end of a pressing lever 54 respectively engage with ends of an extension spring 55. The support frame 53 is thus forced to swing clockwise as illustrated in FIG. 2.

The pressing lever 54 is pivotally supported by the main frame via the pivot 541 so as to freely swing with respect to the main frame, has the aforementioned spring engaging pin 542 on one end, and has an elongated hole 543 formed on the opposite end. An inner circumferential edge of the elongated hole 532 engages with a pin 561 of a cam plate 562.

The cam plate 562 rotates clockwise, integrally with a cam gear 56, the cam gear 56 being engaged with a drive gear 57 that is driven to rotate counter-clockwise by a non-diagrammed drive power source. As the cam plate 562 rotates clockwise, the pin 561 engaged with the inner circumferential edge of the elongated hole 543 also rotates in the same direction thereas, and thus, the pressing lever 54 swings by a predetermined angle by rotating clockwise.

As such, the support frame 53 is caused to swing in a clockwise direction via the extension spring 55, and the pressurising roller 52 is thereby configured to apply a predetermined contact force to the fixing roller 51.

(3) Fixing Roller Drive Shaft Bearing Configuration

Figure 3A:
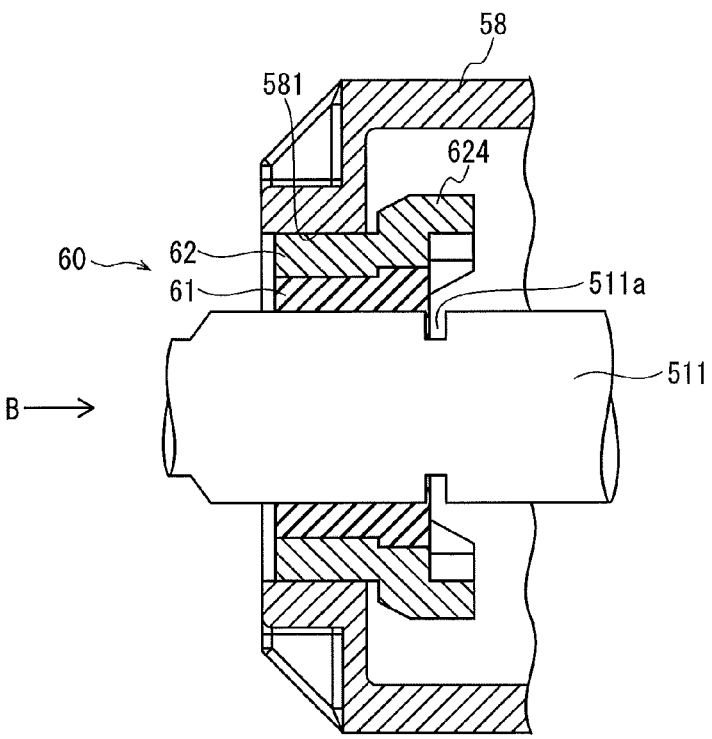
FIG. 3A is a cross-sectional diagram illustrating the configuration of a bearing member of a drive shaft for a fixing roller of the fixing device.
Figure 3B:
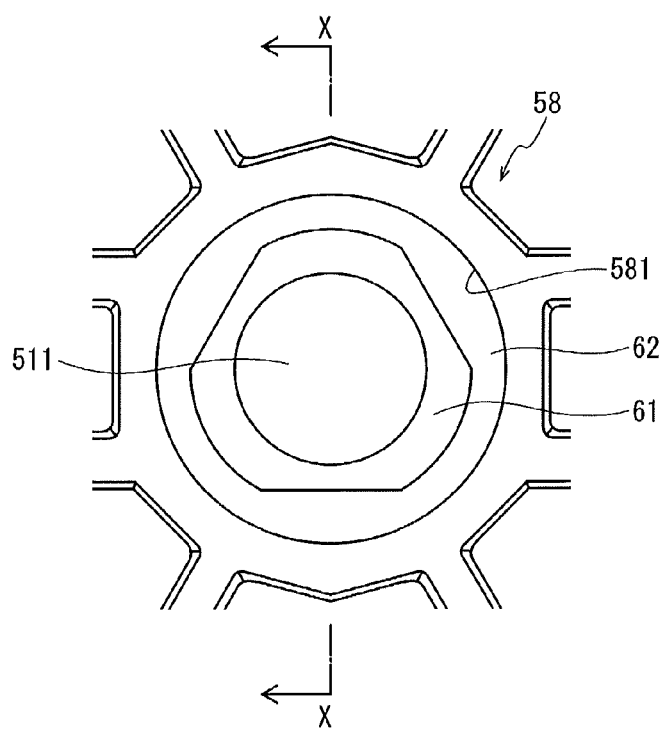
FIG. 3B is a front view of the bearing member as seen from the direction of arrow B in FIG. 3A.

FIG. 3A is a vertical cross-section view along a centre of a drive shaft 511 of the fixing roller 51 in a bearing structure 60, and FIG. 3B is a top-down view of FIG. 3A.

The drive shaft 511 is held by a sintered bearing 61 so as to be able to rotate.

The sintered bearing 61 is manufactured by compression-molding a metallic powder and sintering the molded metallic powder, and contains multiple pores. The pores, being impregnated with lubricant, provide auto-lubrication to the sintered bearing 61.

Accordingly, the sintered bearing 61 is not only usable for extended periods of time without supplying further lubricant, but is also comparatively quiet due to being porous, and has the further merit of being amenable to mass production and thus enabling a reduction in manufacturing costs.

The sintered bearing 61 is mounted in a mounting hole 581 of the main frame 58 through a resin collar 62 by press fitting.

The resin collar 62 and the main frame 58 are each formed by mould injection in consideration of workability. The material for the main frame 58 is beneficially a resin that is heat-resistant, rigid, and amenable to precise dimensions. In the present description, GF-PET (Glass-Fiber Polyethylene Terephtalate) is used.

Also, the resin collar 62 absorbs deformation upon being press fit into the mounting hole 581 and, as described later, serves as a buffer when the pressurising roller 52 applies pressure. Thus, a resin that is softer (i.e., having a lower elastic modulus) than the main frame 58, and that is exceptionally resistant to heat and shocks, is beneficial. In the present Embodiment, the resin is POM (polyacetal).

Incidentally, the Young's modulus (i.e., the tensile modulus, in units of GPa) of the sintered metal, the GF-PET, and the POM used herein is respectively given as 200, 12.1, and 0.25. As such, the POM used for the resin collar 62 is the softest material.

Figure 4A:
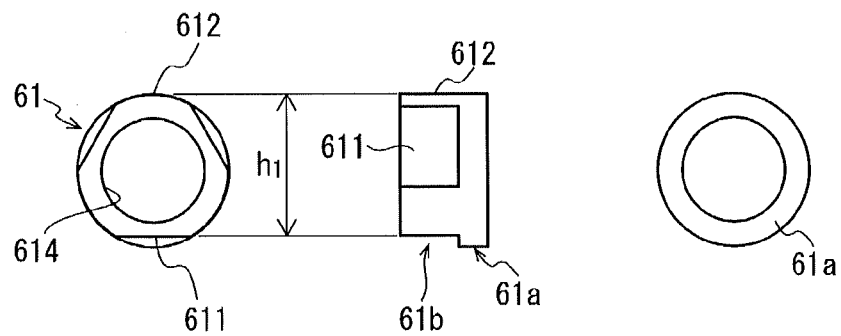
FIGS. 4A and 4B each show a front view, a side view, and a rear view of a sintered bearing and a resin collar, respectively.
Figure 4B:
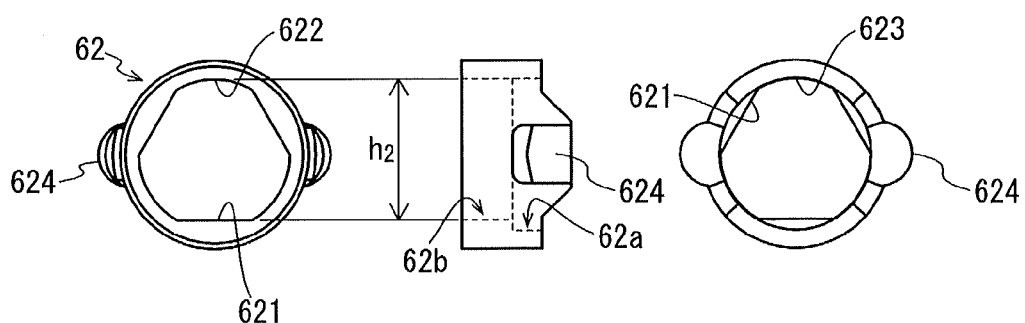

FIGS. 4A and 4B respectively illustrate the sintered bearing 61 and the resin collar 62 prior to assembly, each showing a front view on the right-hand side, a side view in the middle, and a back view on the left-hand side.

As shown in FIG. 4A, the sintered bearing 61 includes a base portion 61a and a engaging portion 61b. The base portion 61a is cylindrical, and the engaging portion 61b is shaped such that a cross-sectional contour thereof is shaped like an equilateral triangle with rounded vertices, having an apex 612 at three positions.

The radius of curvature of each apex 612 is equal to the radius of the cylindrical base portion 61a. That is, the outer circumference of the base portion 61a extends to the apexes 612, such that both are included in the surface area of a cylinder having the same diameter thereas. As described below, in the present Embodiment, each apex 612 serves as a projection for forming the pressurised positions.

In addition, a pair of rotation-stopping protuberances 624 are arranged along the outer circumference of the resin collar 62 so as to protrude radially on opposite sides thereof. The resin collar 62 has a first engaging hole 62a, in which the base portion 61a of the sintered bearing 61 is engaged, and a second engaging hole 62b, in which the engaging portion 61b is engaged, the first engaging hole 62a and the second engaging hole 62b being arranged coaxially and adjacent to each other.

Figure 4C:
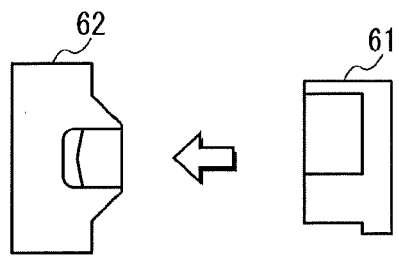
FIG. 4C shows the resin collar as mounted onto the sintered bearing.

Then, the bearing structure 60 is formed by inserting the sintered bearing 61 into the resin collar 62 toward the first engaging hole 62a, as shown by the arrow in FIG. 4C.

With respect to FIG. 4a, a distance h1 is defined as extending from the highest point of the apex 612 of engaging portion 61b in the sintered bearing 61 to a linear portion 611, opposite. Similarly, a distance h2 is defined as a maximum distance from a portion 622 corresponding to the apex 612 of the second engaging hole 62b in the resin collar 62 to a linear portion 621, opposite. The relation h2<h1 holds. When the sintered bearing 61 is engaged into the resin collar 62, then as shown in the frontal view of FIG. 5, portions of the circumference of the resin collar 62 corresponding to each apex 612 of the sintered bearing 61 are each pressed by the corresponding apex 612 and caused to rise, thus forming projections 622a, 622b, 622c.

The height of these projections falls within a range of 15 μm to 100 μm, and defines the difference between h1 and h2.

Figure 6:
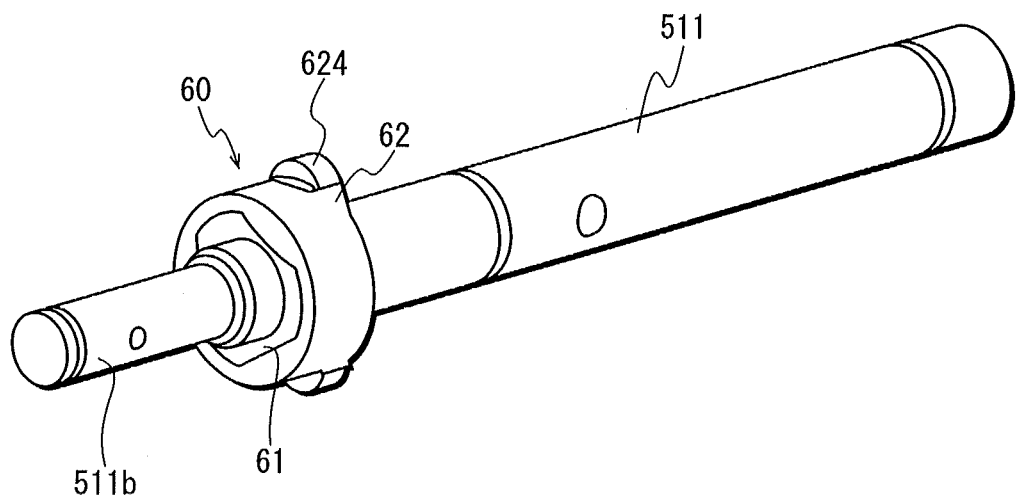
FIG. 6 is a perspective view of the drive shaft inserted in an axial hole of the sintered bearing on which the resin collar is mounted.

FIG. 6 is a perspective view diagram showing the assembly, with the drive shaft 511 inserted into an axial hole of the sintered bearing 61 in the bearing structure 60.

Figure 7A:
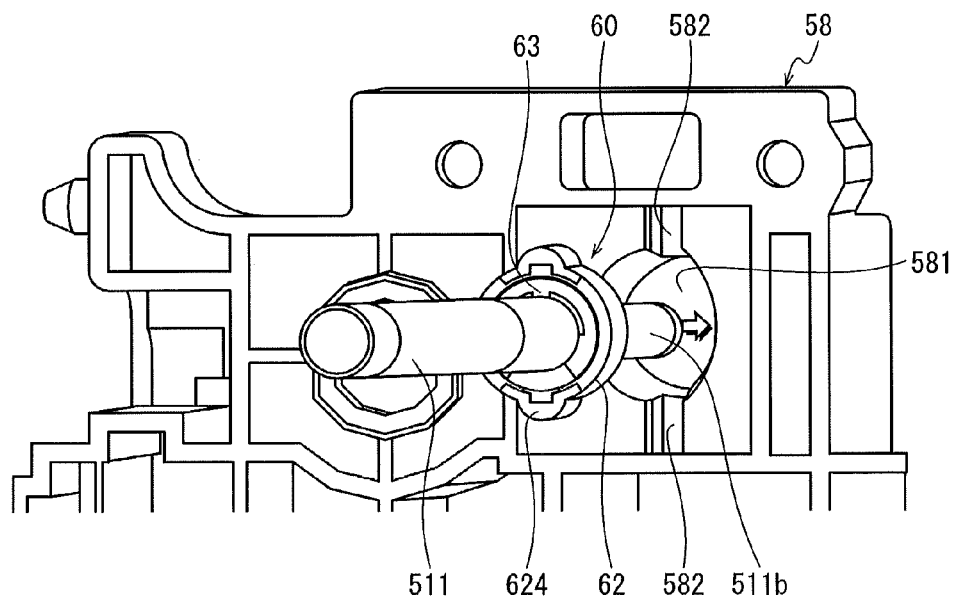
FIG. 7A illustrates the drive shaft of FIG. 6 as inserted in a mounting hole of a main frame.

When assembled as indicated, then as shown in FIG. 7A, the drive shaft 511 is inserted into the mounting hole 581 from inside the main frame 58, beginning with a leading end 511b thereof. In the drawings, reference sign 63 designates an E-ring engaged with an annular groove 511a of the drive shaft 511 (see FIG. 3A), constraining the bearing structure 60 to prevent movement in a direction opposite the insertion direction.

A pair of grooves 582 are formed vertically on each side of the mounting hole 581 at an entrance of the mounting hole 581 of the main frame 58. The width of the grooves 582 is enough to precisely accommodate each of the pair of rotation-stopping protuberance 624 formed at the circumference of the resin collar 62.

Figure 7B:
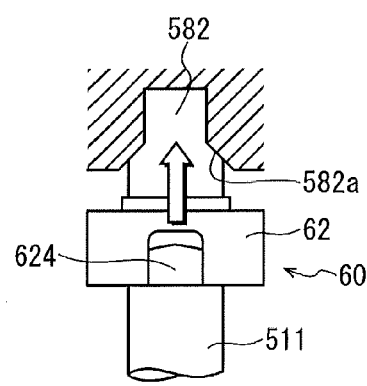
FIG. 7B illustrates a rotation-stopping protuberance of the resin collar engaged within a groove formed in an entrance of the mounting hole.

FIG. 7B is a top view of a cross-section taken perpendicularly to the longitudinal direction of the grooves 582 in the upper portion of FIG. 7A. As shown, the width of the grooves 582 includes a wider tapered portion 582a toward the entrance.

Accordingly, when the bearing structure 60 is press fit into to the mounting hole 581 of the main frame 58, the rotation-stopping protuberance 624 is guided by the tapered portion 582a at the entrance of the grooves 582 despite the positions of the grooves 582 and the rotation-stopping protuberance 624 not being properly aligned. Thus, the bearing structure 60 is press fit into the mounting hole 581 while aligned for entry into the vertical groove 582, which improves ease of manufacturing at the assembly stage.

In order to have the tapered portion 582a of the grooves 582 smoothly guide the rotation-stopping protuberance 624, tapering an end of the rotation-stopping protuberance 624 facing the leading end 511b of the drive shaft 511 is also beneficial.

The radius of the mounting hole 581 is slightly smaller than the distance separating the centre of the bearing structure 60 from the top of each of the projections. Thus, when the bearing structure 60 is pressed into the mounting hole 581, the bearing structure 60 is press fit via the projections 622a, 622b, 622c (see FIG. 5).

(4) Impact Mitigation Effect Principles

FIGS. 8A, 8B, 9A, and 9B are schematic diagrams indicating the principles of impact mitigation by the mounted structure of the bearing structure 60 pertaining to the present Embodiment.

In the drawings, the dashed ovals indicate positions pressurised by the projections 622a, 622b, 622c (see FIG. 5) formed at the circumference of the resin collar 62 (hereinafter termed pressurised positions).

As shown, the projections 622a, 622b, 622c collapse upon press fitting, and thus the outer circumference of the engaging portion of the resin collar 62 appears to be entirely in contact with the inner circumference of the mounting hole 581. However, in actuality, portions opposite the pressurised positions with respect to the centre of the drive shaft 511 provide extremely small gaps between the outer circumference of the resin collar 62 and the inner circumference of the mounting hole 581.

The radius of the mounting hole 581 and the distance from the centre of the bearing structure 60 to the top of each of the projections is determined in a step of planning or manufacturing a trial piece, such that the size of these gaps, upon press fitting, is on the order of 5 μm to 100 μm.

At the pressurised positions, the resin collar 62 is made to protrude from the inside by each apex 612 of the sintered bearing 61, and is compressed from the outside by the inner circumference of the mounting hole 581, thus resulting in double pressurization. Increasing the density of such doubly-pressurised portions also increases the elastic modulus. The present disclosure describes three such doubly-pressurised portions with increased elastic modulus. As such, backlash is unlikely to occur as the doubly-pressurised portions engage tightly with the inner circumferential surface of the mounting hole 581.

In addition, gaps exist between the outer circumference of the resin collar 62 and the inner circumference of the mounting hole 581 at a position opposite the pressurised position with respect to the centre of the rotary shaft (i.e., at a position rotated 180° from the pressurised position with respect to the rotary shaft, hereinafter termed opposite position). The density of the resin collar at the opposite position remains nearly unchanged before and after the bearing structure is press fit into the mounting hole 581, maintaining low elastic modulus (i.e., easily absorbing shocks, hereinafter termed low-elasticity portion).

In the assembly structure as described above, first, as shown in FIG. 8A, when impact force F1 is applied downward on the drive shaft 511, small gaps form as described above in the direction of application of the force F1. Thus, the impact force F1 is not directly transmitted to the main frame 58. A part of the impact force F1 is absorbed and attenuated by the low-elasticity portion of the resin collar 62 between the gap and the drive shaft 511 while a remaining part of the impact force F1 is divided into forces F11 and F12, propagated to the main frame 58 toward other pressurised positions.

Figure 8A:
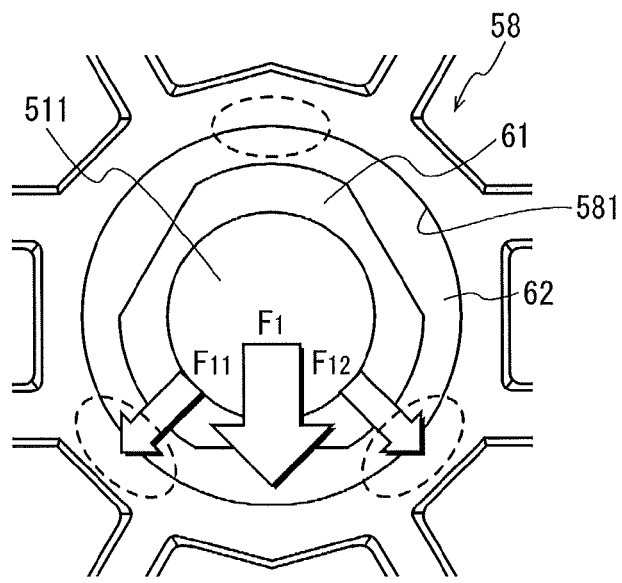
FIGS. 8A and 8B schematically illustrate an impact force applied to the rotary shaft being effectively dissipated by the mounting structure of the bearing member pertaining to the present Embodiment.
Figure 8B:
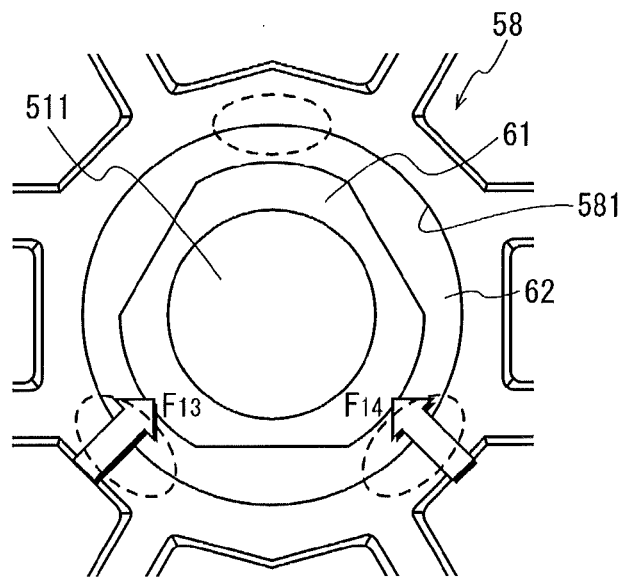

FIG. 8B illustrates reaction forces F13 and F14 that may arise upon the inner circumferential surface of the mounting hole 581 of the main frame 58 receiving the above-described forces F11 and F12 divided from impact force F1.

The reaction forces F13 and F14 arise from the pressurised positions as reactions to the forces F11 and F12, and are applied in respective directions opposing the forces F11 and F12. Of course, gaps do exist between the resin collar 62 and the mounting hole 581 at the opposite positions. Thus, the reaction forces are absorbed and attenuated at the gaps and the low-elasticity portion. Further, any remaining components of the reaction forces are divided by the pressurised positions adjacent to the gaps, and the above effect of attenuation is repeated, thus accelerating the attenuation of the impact force.

While it is possible that conditions such as the size of the projections may not always cause gaps at the opposite positions, the presence of the low-elasticity portions causes largely similar impact absorbing effects.

Figure 9A:
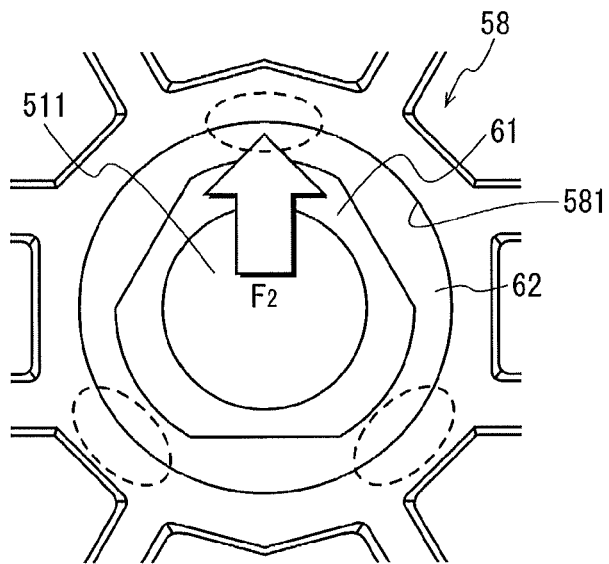
FIGS. 9A and 9B schematically illustrate an impact force applied to the rotary shaft in a different direction than that shown in FIGS. 8A and 8B being effectively dissipated by the mounting structure of the bearing member pertaining to the present Embodiment.
Figure 9B:
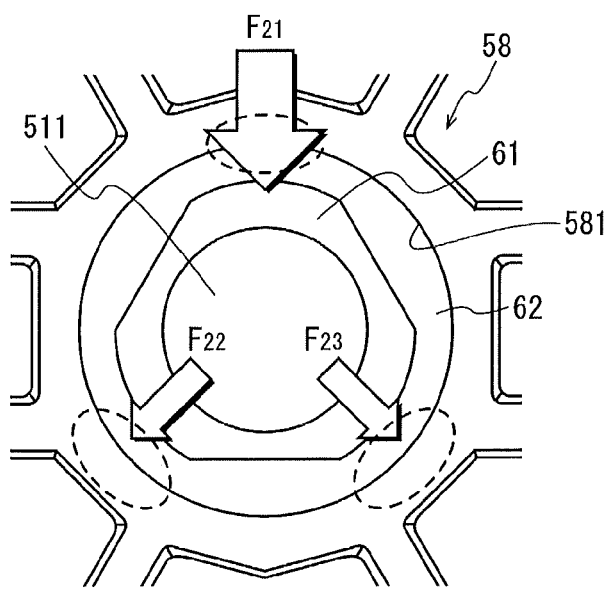

Also, as shown in FIG. 9A, when impact force F2 is applied to the drive shaft 511 toward the pressurised positions, the resin collar 62 is already contracted at that position. Thus, a primary impact-absorbing effect is not as great as that indicated in FIG. 8B. However, as shown in FIG. 9B, reaction force F21 from the mounting hole 581 is absorbed by the gap and the low-elasticity portion at the opposing portion, while the remaining force is split into forces F22 and F23. The rest of the attenuation process proceeds and is repeated as per FIGS. 8A and 8B, resulting in rapid attenuation of the impact.

When an impact force is applied to the drive shaft 511 from a direction other than those illustrated in FIGS. 8A, 8B, 9A, and 9B, the magnitude and direction of the forces divided at the pressurised positions change slightly. Otherwise, the attenuation process is repeated, essentially as described above. Thus, when impact forces are applied to the drive shaft 511 during pressing and separation operations, these forces are immediately attenuated, leading to a great reduction in noise.

Figure 10A:
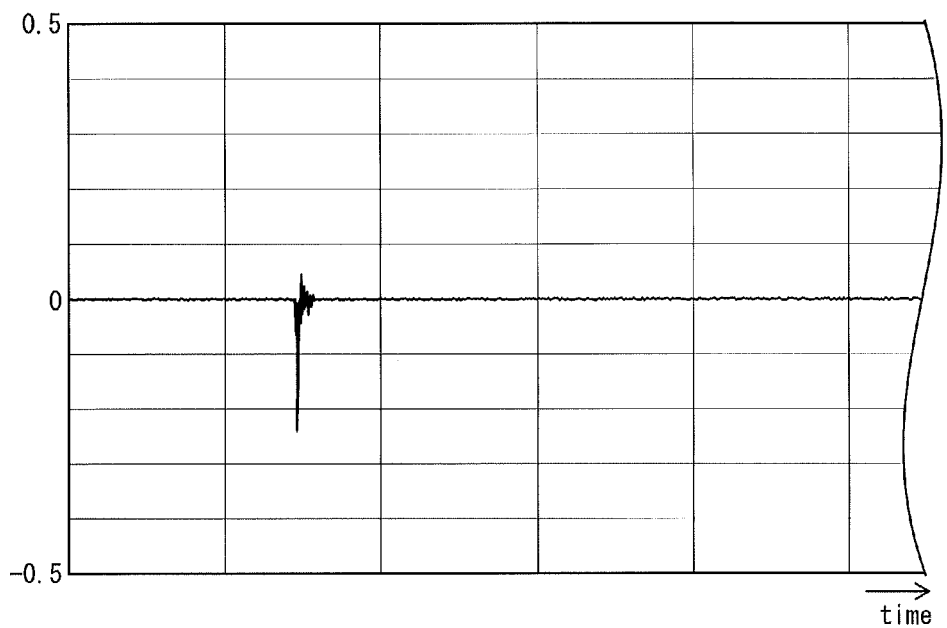
FIG. 10A illustrates experimental results of the impact force mitigated by the mounting structure for the bearing member pertaining to the Embodiment.
Figure 10B:
FIG. 10B illustrates results of a similar experiment using a conventional mounting structure.

FIGS. 10A and 10B each indicate the magnitude of vibrations produced when the fixing roller 51 and the pressurising roller 52 are in pressing contact, as actually measured by a vibration sensor. FIG. 10A indicates measurements taken using the bearing structure of the present Embodiment, while FIG. 10B indicates measurements taken using conventional technology in which the entire outer circumferential surface of a resin collar is press fit into the inner circumference of the mounting hole. In FIGS. 10A and 10B, the horizontal axis indicates time, in seconds, and the vertical axis indicates the output voltage, in volts, of the sensor.

Comparing the two reveals that the bearing structure of the present Embodiment produces vibrations with approximately half the amplitude of the conventional technology. This clearly shows effective vibration absorption, and accordingly, the superb noise-reduction effect is obtained.

Figure 11:
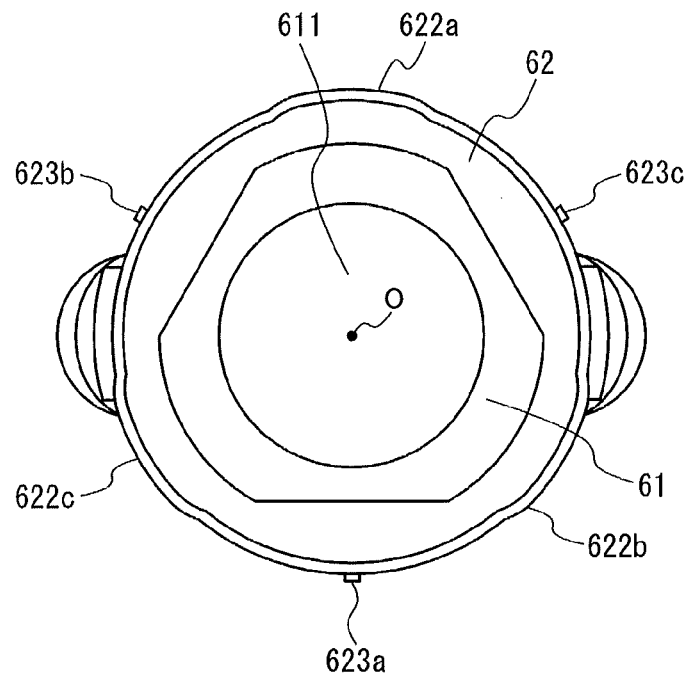
FIG. 11 illustrates a comparative example in contrast to the Embodiment, where other projections are formed at an outer circumferential surface of the resin collar at positions rotated by 180° from the projections.

As a point of comparison to the present invention, the measurements of FIGS. 10A and 10B were also performed on a comparative example as shown in FIG. 11, in which ribbed projections 623a, 623b, 623c are formed at positions opposite the projections 622a, 622b, 622c of the resin collar 62 with respect to a centre O of the drive shaft 511. The results were similar to those shown in FIG. 10B.

Here, the opposite positions of the projections are also pressurised positions. Thus, no gaps or low-elasticity portions are formed at the opposite positions of the projections, as occurs in the present Embodiment. Thus, not only is the impact insufficiently absorbed, but the effect of splitting the reaction force into parts applied to directions other than the direction in which the impact force is applied does not occur.

In the above-described Embodiment, only the mounting structure of the bearing member for the drive shaft 511 of the fixing roller 51 in the fixing device 5 of FIG. 2 is described. However, a similar structure is also applicable to the bearing member of other shafts, such as the rotary shaft 521 of the pressurising roller 52, the drive shaft 563 of the cam gear 56, and the drive shaft 571 of the drive gear 57. By applying the structure to at least one of these shafts, engagement occurs at the three pressurised positions at the inner circumference of the mounting hole. Thus, the bearing member is positioned correctly without backlash, and vibrations of the rotary shaft are quickly absorbed and attenuated, resulting in greater noise reduction than that achieved by conventional technology.

(5) Variations

The present invention has been described above with reference to the Embodiment. However, no particular limitation is intended. For example, the following variations are possible.

Figure 5:
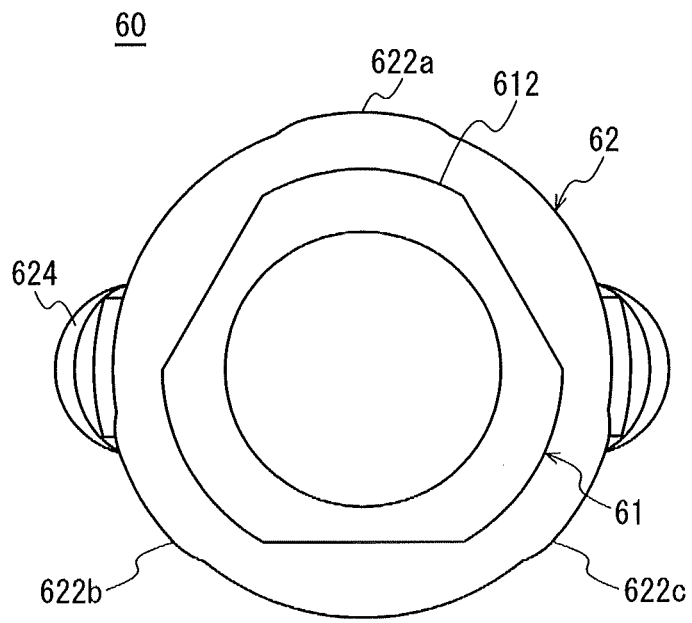
FIG. 5 is a front view of the sintered bearing as mounted in the resin collar.

(5-1) In the present Embodiment, as shown in FIGS. 4A and 4B, the projections at the circumference of the resin collar 62 are formed by having the dimensions h2 of a portion in the second engaging hole 62b corresponding to the height h1 of the apex 612 of the sintered bearing 61 be such that h2 is smaller than h1, and as shown in FIG. 5, by forcing the circumferential surface of the resin collar 62 to protrude in portions corresponding to the three apexes 612 of the sintered bearing 61. This has the beneficial result of easily forming doubly-pressurised portions in the resin collar 62.

Figure 12:
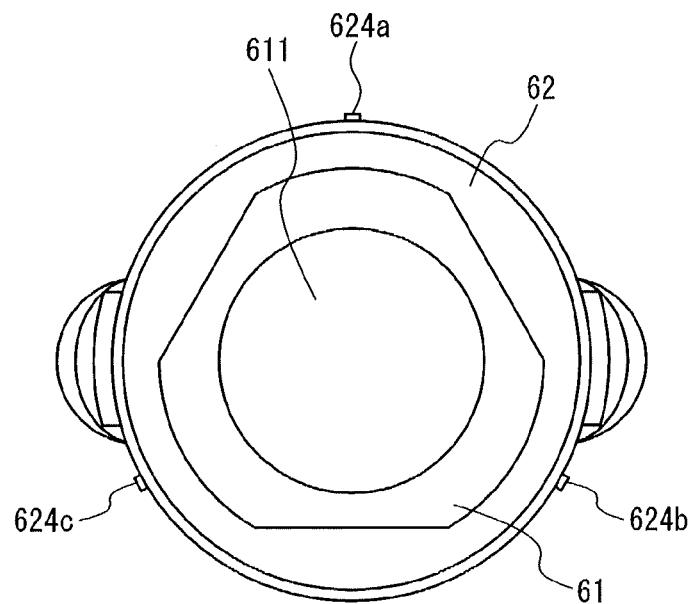
FIG. 12 illustrates the configuration of a variation of the mounting structure for the bearing member of the Embodiment.

In one variation, the shape of the projections formed by the above-described forced protruding is modified so as to provide projections 624a, 624b, 624c at positions matching those of the apexes of the sintered bearing 61 at the circumferential surface of the resin collar 62, as shown in FIG. 12. This is also achievable by press fitting into the mounting hole 581 via the projections. The projections pertaining to this variation and the projections caused by the forced protruding of the Embodiment may be combined by matching the phases thereof (here, phase indicates a direction with respect to the central axis of the rotary shaft) to produce a further double-pressurising effect.

(5-2) In the above-described Embodiment, the three projections are disposed at equal intervals in the circumferential direction. However, the projections are not limited to being three in number. Four or more projections may also be used, and the same effects are realized provided that the projections are formed at positions arranged radially with respect to the central axis of the rotary shaft and that no press fitting region occurs at a position opposite one of the projections (i.e., at a position rotated 180° therefrom, with respect to the central axis of the rotary shaft).

In terms of stabilizing the bearing structure 60 as mounted in the mounting hole 581 and of dispersing shocks applied to the rotary shaft from all directions as evenly as possible, preferably applying pressure to the pressurised positions from the inner circumferential surface of the mounting hole 581 is performed such that the pressure is equal. Thus, equalizing the angle between all projections (i.e., the angle between neighboring line segments among line segments radially connecting the centre of the shaft to the centre of each projection) is beneficial.

In other words, given a regular polygon that is concentric with the centre of the shaft, positioning the projections in phase with the vertices of the polygon is beneficial. In such a situation, when the quantity of projections is even, each projection is positioned opposite another projection with respect to the centre of the rotary shaft. Thus, an odd quantity of projections is beneficial.

Figure 13:
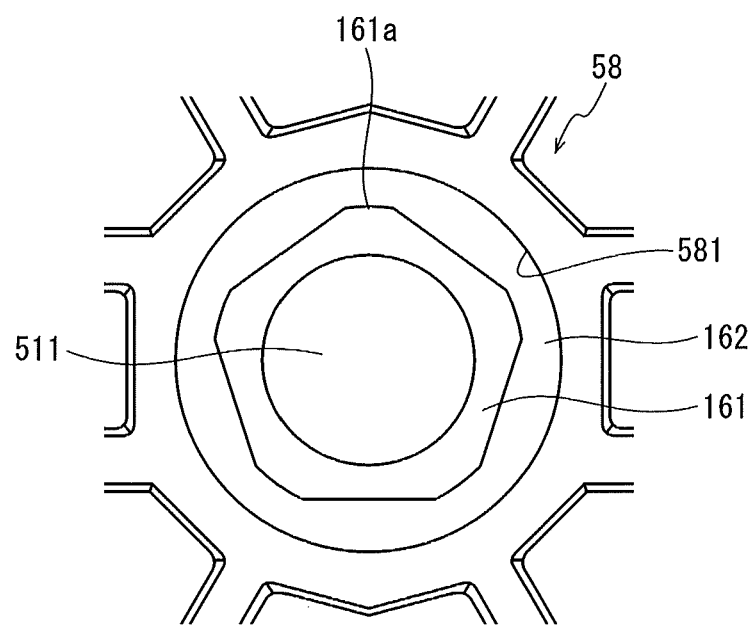
FIG. 13 illustrates the configuration of a second variation of the mounting structure for the bearing member of the Embodiment.

FIG. 13 illustrates an example where the sintered bearing 161 is a regular pentagon having five vertices, and apexes 161a thereof forms five radial projections in the circumferential surface of the resin collar 162, and is press fit into the mounting hole 581. In such a situation, the effects of preventing backlash and reducing impact noise are obtained as in the above-described Embodiment.

Also, despite the quantity of projections being an odd number, the shape approaches that of the cylinder when the quantity is too great. This results in insufficiently large regions for the gaps and low-elasticity portions at the opposite positions of the projections, and thus weakens the impact absorbing effect. As such, a quantity on the order of seven, at most, is beneficial.

In that sense, a quantity of three projections, as discussed in the above Embodiment, is most preferred. Using three evenly-spaced projections allows the bearing structure to be reliably positioned, maximizes the circumferential range for the gaps opposite the projections, and enables sufficient radial thickness at the low-elasticity portions.

Figure 14:
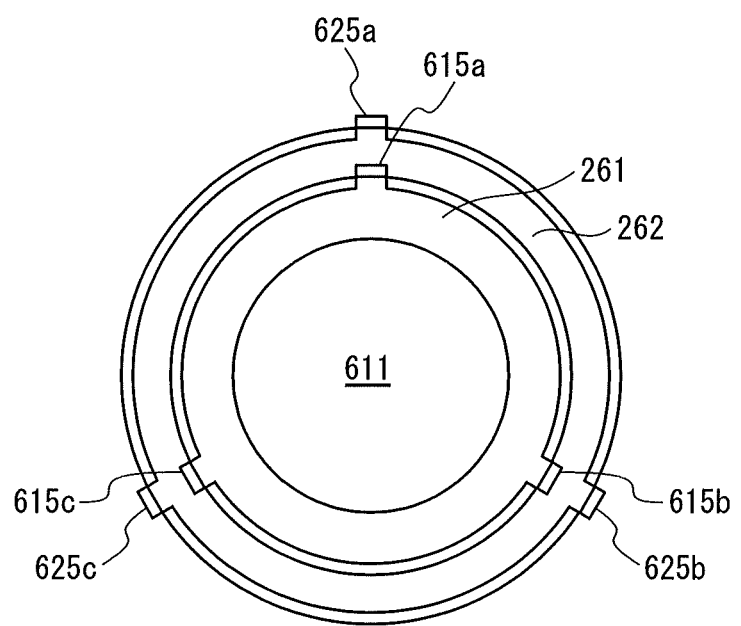
FIG. 14 illustrates the configuration of a third variation of the mounting structure for the bearing member of the Embodiment.

(5-3) The sintered bearing 61 is not limited to having a triangular engaging portion as described in the above Embodiment. As shown in FIG. 14, the sintered bearing 261 may be substantially cylindrical, having ribbed projection 615a, 615b, 615c extending in the axial direction along the circumferential surface thereof, and similar ribbed projections 625a, 625b, 625c extending in the axial direction are provided on the circumferential surface along the resin collar 262 at positions in-phase with the projections on the sintered bearing 261.

In such a situation, three doubly-pressurised portions are formed at equal intervals in the circumferential direction, and the gaps and low-elasticity portions are formed at the opposite positions thereof. The same effects as the above-described Embodiment are thus achieved.

Figure 15A:
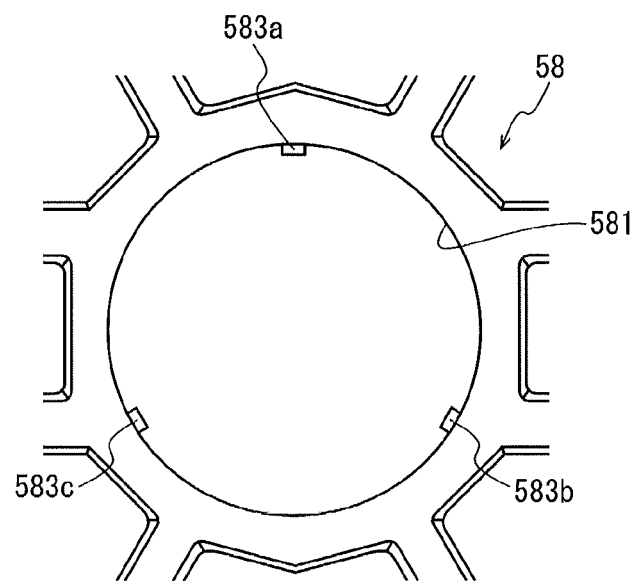
FIGS. 15A and 15B illustrate the configuration of a fourth variation of the mounting structure for the bearing member of the Embodiment.
Figure 15B:
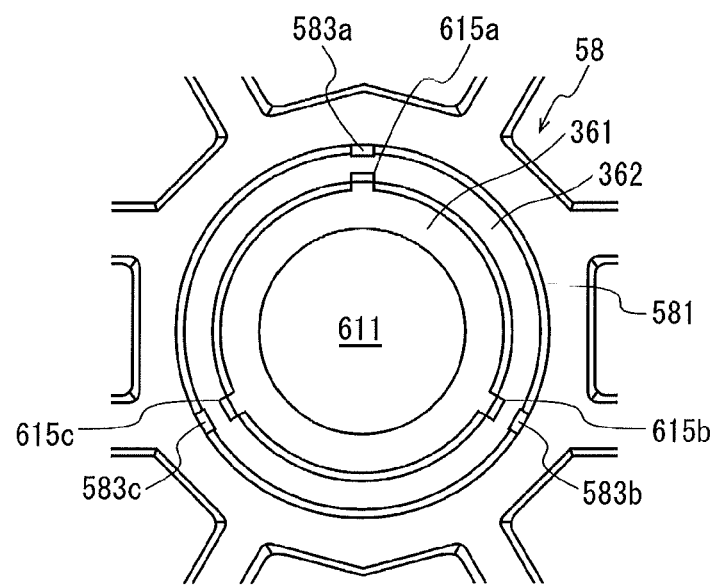

Further, the projections 625a, 625b, 625c need not necessarily be provided at the outer circumferential surface of the resin collar 262. Instead, as shown in FIG. 15a, similar ribbed projections 583a, 583b, 583c may be provided at the inner circumferential surface of the mounting hole 581 in the main frame 58, at positions corresponding to those of the projections 625a, 625b, 625c described above. Then, as shown in FIG. 15B, doubly-pressurised portions are formed when the sintered bearing 361 mounted in the resin collar 362 is press fit into the mounting hole 581, producing the effects illustrated in FIG. 14.

Ultimately, the results of the present disclosure are obtainable by forming three or more projections at one of three or more positions on at least one of an outer circumferential surface of the bearing structure 60 and the inner circumferential surface of the mounting hole 581, the positions extending radially from a centre of the rotary shaft, which causes a plurality of pressurised positions to be dispersed circumferentially, provided that no pressurization region of a pressurised position exists at the opposite position of the other pressurised position.

(5-4) In the above-described Embodiment, doubly-pressurised portions are formed between the sintered bearing 61 and the mounting hole 581 through the resin collar 62. Positioning and impact absorption are then achieved by the gaps provided at the opposite positions.

However, the positioning effect is also obtainable without recourse to the resin collar 62, being achievable by inserting the sintered bearing 61 directly into the mounting hole 581 in the manner that a plurality of pressurised positions exist at different positions in the circumferential direction. Also, given that gaps are produced between the opposite positions of each pressurised position, the impact force is somewhat mitigated, presenting an improvement over conventional technology.

(5-5) The above Embodiment describes the mounting structure for the bearing member of the rotary shaft in the fixing device 5. However, the effects of the mounting structure are also applicable to the bearing member of other rotary components of the image forming apparatus (e.g., the photosensitive drum, the driving roller and the driven roller on which the intermediate transfer belt hangs, and a developing roller in a developer device) in which minute positioning is required for the shaft, and in which vibrations are undesirable. In such components, mechanical vibration, such as gear-driven mechanical vibration, is transmitted to the rotary shaft which causes not only noise but also image degradation. These problems are also ameliorated by applying the mounting structure for the bearing member of the above Embodiment.

(5-6) The above Embodiment describes the bearing member of the disclosure as an example applied to a fixing device in a tandem color printer. However, the disclosure is also applicable to an image forming apparatus that is a monochrome printer, a copier, a FAX machine, or a multi-function peripheral incorporating one or more of these functions.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A mounting structure for a bearing member, comprising:
   the bearing member configured to support a rotary shaft;
   a frame body that includes a mounting hole, wherein the bearing member is press-fit into the mounting hole through a collar made of resin; and
   a plurality of projections, each of the projections being formed at one of three or more positions on at least one of an outer circumferential surface of the bearing member and an inner circumferential surface of the mounting hole, the positions extending radially from a center of the rotary shaft, the bearing member being press fitted into the mounting hole via the projections, wherein
   each of the projections is formed at a circumferential position having no other projection formed at a position 180° therefrom with respect to the center of the rotary shaft.

2. The mounting structure of claim 1, wherein
   the projections are provided at an odd number of positions, the odd number being equal to or greater than three, and
   when viewed parallel to the rotary shaft, an angle between two neighboring line segments among a plurality of line segments each joining a circumferential center of one of the projections to the center of the rotary shaft is equal to any other such angle.

3. The mounting structure of claim 1, wherein
   the projections are formed at three positions.

4. The mounting structure of claim 1, wherein
   the frame body is made of a resin material.

5. The mounting structure of claim 4, wherein
   the collar is made of a resin material having a lower elastic modulus than the frame body.

6. The mounting structure of claim 1, wherein
   the collar is made of a resin material having a lower elastic modulus than the frame body.

7. The mounting structure of claim 1, wherein
   the projections are formed on the outer circumferential surface of the bearing member, and
   additional projections are also formed at positions on an outer circumferential surface of the collar, the positions coinciding with the projections in terms of rotation with respect to the center of the rotary shaft.

8. The mounting structure of claim 1, wherein
   the projections are provided at positions facing one another on the outer circumferential surface of the bearing member and on the inner circumferential surface of the mounting hole.

9. The mounting structure of claim 1, wherein
   the projections are formed at least on the outer circumferential surface of the bearing member, and
   an outer circumference of the collar is a cylindrical surface prior to mounting, and additional projections are formed on the outer circumference of the collar by causing the cylindrical surface to be pressurized from inside by the projections of the bearing member and to rise when the collar is mounted on the outer circumference of the bearing member.

10. The mounting structure of claim 1, wherein
    one or more protrusions are formed so as to protrude in a radial direction, on a part of an outer circumference of the collar that is not engaged with the mounting hole, and
    the one or more protrusions serve as an aligning portion regulating rotation of the collar by engaging with an engaging groove provided at an entrance of the mounting hole of the frame body.

11. A fixing device comprising a mechanism operable to contact and separate a fixing roller and a pressing roller, wherein
    a bearing member of at least one rotary shaft, among rotary shafts for the fixing roller and the pressing roller and a rotary shaft in the mechanism, is mounted in a mounting hole of a support frame using the mounting structure for the bearing member of claim 1.

12. An image forming apparatus, comprising
    the fixing device of claim 11.

13. An image forming apparatus, wherein
    a bearing member of one or more rotary shafts for rotary bodies is mounted in a support frame using the mounting structure for the bearing member of claim 1.

* * * * *